United States Patent
Zhang et al.

(10) Patent No.: US 9,239,827 B2
(45) Date of Patent: Jan. 19, 2016

(54) IDENTIFYING COLLOCATIONS IN A CORPUS OF TEXT IN A DISTRIBUTED COMPUTING ENVIRONMENT

(75) Inventors: Xiong Zhang, Shanghai (CN); Hung-chih Yang, Bellevue, WA (US); Danny Lange, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 330 days.

(21) Appl. No.: 13/526,527

(22) Filed: Jun. 19, 2012

(65) Prior Publication Data

US 2013/0339000 A1 Dec. 19, 2013

(51) Int. Cl.
*G06F 17/27* (2006.01)
*G06Q 50/00* (2012.01)

(52) U.S. Cl.
CPC .............. *G06F 17/277* (2013.01); *G06Q 50/01* (2013.01)

(58) Field of Classification Search
CPC ............................... G06F 17/27; G06F 17/277
USPC ............................................................ 704/9
See application file for complete search history.

(56) References Cited

U.S. PATENT DOCUMENTS

| | | | |
|---|---|---|---|
| 5,331,556 A * | 7/1994 | Black et al. ........................ | 704/9 |
| 7,373,291 B2 * | 5/2008 | Garst ....................... | G06K 9/72 704/10 |
| 7,555,428 B1 * | 6/2009 | Franz ..................... | G06F 17/277 704/10 |
| 7,650,331 B1 | 1/2010 | Dean et al. | |
| 8,271,403 B2 * | 9/2012 | Rieck et al. ...................... | 706/12 |
| 8,983,826 B2 * | 3/2015 | Brdiczka ............. | G06F 17/2705 704/257 |
| 2009/0313227 A1 | 12/2009 | Dunning et al. | |
| 2010/0312545 A1 | 12/2010 | Sites | |

OTHER PUBLICATIONS

Ammari, et al., "Distributed Data Mining for User Sensemaking in Online Collaborative Spaces", Retrieved at <<http://dicode.cti.gr/dicosyn12/conf_files/7_Ammari_Lau_Dimitrova_DicoSyn2012.pdf>>, CSCW, ACM, Feb. 11, 2012, pp. 1-10.

Owen, et al., "Mahout in Action", Retrieved at <<http://manning.com/owen/MiA_SampleCh08.pdf>>, Retrieved Date: Feb. 15, 2012, pp. 1-20.

Balkir, et al., "A Distributed Look-up Architecture for Text Mining Applications using MapReduce", Retrieved at <<http://mmc.geofisica.unam.mx/edp/Ejemplitos/SC11/src/pdf/papers/tp56.pdf>>, SC Proceedings of International Conference for High Performance Computing, Networking, Storage and Analysis, ACM, 2011, pp. 1-11.

Phillips, Jeff M., "MapReduce on Amazon Web Services", Retrieved at <<http://www.cs.utah.edu/~jeffp/teaching/cs7960/A3-MapReducesmall.pdf>>, Nov. 16, 2011, pp. 1-4.

Hall, et al., "MapReduce/Bigtable for Distributed Optimization", Retrieved at <<http://static.googleusercontent.com/external_content/untrusted_dlcp/research.google.com/en//pubs/archive/36948.pdf>>, Retrieved Date: Feb. 15, 2012, pp. 1-7.

(Continued)

*Primary Examiner* — Susan McFadden
(74) *Attorney, Agent, or Firm* — Nicholas Chen; Kate Drakos; Micky Minhas

(57) ABSTRACT

Technologies pertaining to computing a metric that is indicative of whether an n-gram in a large corpus of text is a collocation are described herein. The metric is computed in connection with a distributed computing framework, wherein n-grams of varying lengths can be analyzed in a single input data pass, and wherein secondary sorting functionality of the distributed computing framework need not be invoked.

20 Claims, 7 Drawing Sheets

(56) References Cited

OTHER PUBLICATIONS

"Surprise and Coincidence—Musing from the Long Tail", Retrieved at <<http://tdunning.blogspot.com/2008/03/surprise-and-coincidence.html>>, Mar. 21, 2008, pp. 1-4.

"Collocations in Mahout", Retrieved at <<https://cwiki.apache.org/confluence/display/MAHOUT/Collocations>>, 2011, pp. 1-7.

"Collocation", Retrieved at <<http://en.wikipedia.org/wiki/Collocation>>, Retrieved Date: Feb. 15, 2012, pp. 1-4.

* cited by examiner

FIG. 2

TOKENS 1,2 FREQUENCIES FOR PREFIX/SUFFIX COMBINATIONS

|  | SUFFIX OCCURS | SUFFIX DOES NOT OCCUR | TOTALS |
|---|---|---|---|
| PREFIX OCCURS | $K_{11}$ | $K_{12}$ | $K_{1*}$ |
| PREFIX DOES NOT OCCUR | $K_{21}$ | $K_{22}$ | $K_{2*}$ |
| TOTALS | $K_{*1}$ | $K_{*2}$ | $K_{**}$ |

FIG. 3

TOKENS 1,2 EXPECTED FREQUENCIES FOR PREFIX/SUFFIX COMBINATIONS

|  | SUFFIX OCCURS | SUFFIX DOES NOT OCCUR |
|---|---|---|
| PREFIX OCCURS | $E_{11}$ | $E_{12}$ |
| PREFIX DOES NOT OCCUR | $E_{21}$ | $E_{22}$ |

IDENTIFYING COLLOCATIONS IN A CORPUS OF TEXT IN A DISTRIBUTED COMPUTING ENVIRONMENT

BACKGROUND

Web-based applications have allowed users to be both producers and consumers of content. In an example, web sites have been developed to include web log (blog) applications that allow users to generate documents that include text and images, and share such documents with others. Additionally, social networking applications allow users to generate status messages (which can also be classified as documents) that include images and/or text and publish such information to defined contacts of the user and/or the general public, if desired. In yet another example, micro-blogging applications have been developed that facilitate user-publishing of micro-blogs (e.g., messages of a limited number of characters) that are accessible to subscribers and/or the general public. Much of this content that is produced by users is retained, at least temporarily, in data repositories that are accessible to web search engines.

For many applications, it is desirable to ascertain some semantic meaning of documents in a document corpus; for example, it may be desirable to identify trends in web-based documents for purposes of designing or marketing products. Further, it may be desirable to identify words or phrases that summarize a document, such that when a query that corresponds to one of such words or phrases is submitted by a user to a search engine, the search engine can consider the correspondence between the query and the word or phrase that summarizes the document when positioning the document in a ranked list of search results. Manually undertaking this task of analyzing a large corpus of text (e.g., millions of web-based documents), however, is not possible on a wide scale. For instance, several million micro-blogs are generated over the period of just a few days. Therefore, it is impractical to dedicate human resources to manually review each micro-blog for purposes of understanding and/or classifying a respective micro-blog.

Accordingly, computer-based algorithms have been developed to analyze large corpuses of text. An exemplary analysis undertaken over large corpuses of text is the identification of collocations therein. As used herein, a collocation refers to a sequence of terms that are co-located more often in a corpus of text than would be expected if terms in the corpus of text were arranged randomly. For example, the terms "President George Washington" in sequence may be collocations, as such terms may appear together often in text.

As described above, a significant amount of text is constantly being generated by web users. Relatively recently, algorithms have been developed for execution in distributed computing environments for the purpose of analyzing a large corpus of text, such that analysis of text is performed in parallel across multiple computing nodes. Conventional algorithms that have been developed for execution in distributed computing environments for identifying collocations in documents, however, are relatively inefficient and inflexible.

SUMMARY

The following is a brief summary of subject matter that is described in greater detail herein. This summary is not intended to be limiting as to the scope of the claims.

Described herein are various technologies pertaining to efficiently computing a metric that is indicative of frequency of co-occurrence of a sequence of tokens (e.g., words) in a corpus of text relative to an expected frequency of co-occurrence of the sequence of tokens (if tokens in the text are arranged randomly). The resultant metric can be employed to identify collocations, which can be defined herein as tokens that co-occur sequentially more often than would be expected by chance. As will be described in greater detail herein, sequences of tokens in the corpus of text of varying lengths (specified by a user) can be considered when identifying collocations. With still more specificity, described herein is a computer-executable algorithm that is particularly well-suited for execution in a distributed computing environment. As alluded to above, such computer-executable algorithm can analyze n-grams of varying values of n in a single pass in connection with identifying collocations. For example, such computer-executable algorithm can consider each 2-gram, 3-gram, 4-gram, etc. in a single pass in a distributed computing framework without invoking multiple partition/sort procedures.

In an exemplary embodiment, the computer-executable algorithm can be configured to execute in a map-reduce framework. As will be understood by one skilled in the art, the map-reduce framework allows for distributed processing of map and reduce operations. Map and reduce operations of a map-reduce framework are both defined with respect to data structured in key/value pairs. Accordingly, a computing node that executes a map operation can receive a corpus of text and generate key/value relations based upon n-grams in the corpus of text. In the computer-executable algorithm described herein, the map operation is configured to compute frequencies of each n-gram in the corpus of text, wherein n>1 and can be a variety of values. Thus, the map operation is configured to determine frequencies of, for instance, 2-grams, 3-grams, 4-grams, etc., in a single pass over the corpus of text.

The map operation, when parsing the text, identifies a prefix and suffix in each n-gram. In an exemplary embodiment, the suffix can be a single token, and the prefix can be n−1, tokens, although other arrangements are possible. For each prefix/suffix combination identified by the map operation, the map operation outputs two key/value relations, wherein a key in a key/value relation output by the map operation is a compound key that includes three elements. The first element is the value of n (the length of the sequence of tokens of a prefix/suffix combination). The second element indicates whether the key/value pair corresponds to a prefix or a suffix (e.g. a value of 1 if the key identifies the prefix of the prefix/suffix combination and a value of 2 if the key identifies the suffix of the prefix/suffix combination). The third element of the key is the prefix or suffix itself.

For instance, the corpus of text can comprise the 3-gram "President George Washington". It may be desirable to analyze 2-grams for collocations. The aforementioned map operation can parse the corpus of text and identify the 2-gram "President George". In this 2-gram, the prefix is "President" and the suffix is "George". The map operation generates a pair of key/value relations—a first key/value relation for the prefix "President", and a second key/value relation for the suffix "George". The key of the first key/value pair, then, is (2,1, President), where "2" indicates that a value of the first key/value pair corresponds to 2-grams, "1" indicates that the value of the first key/value pair corresponds to a prefix of the 2-gram, and "President" is the prefix. The key of the second key/value pair is (2,2,George), where "2" indicates that a value of the second key/value pair corresponds to 2-grams, "2" indicates that the value of the first key/value pair corresponds to a suffix, and "George" is the suffix.

If desired, the map operation can also analyze, for instance, each 3-gram in the corpus of text in the same pass. In the exemplary corpus of text "President George Washington", the map operation can identify "President George" as the prefix and "Washington" as the suffix. The map operation can generate a pair of key/value relations for this prefix/suffix combination, wherein the keys, respectively, are (3,1,President George) and (3,2,Washington).

The utilization of keys of this structure in the initial map operation facilitates computation of a plurality of values that are indicative of frequencies corresponding to prefix/suffix combination (the n-gram) for four separate cases. These four cases can include a number of instances of the prefix/suffix combination in the corpus of text, a number of instances that the prefix occurs (as a prefix) without the suffix in the corpus of text, a number of instances that the suffix occurs, as a suffix, without the prefix in the corpus of text, and a number of n-grams in the corpus of text that include neither the prefix (as a prefix) nor the suffix (as a suffix). Using such values, for a particular prefix/suffix combination (n-gram) identified in the corpus of text, expected frequencies for the aforementioned four cases can be computed. Such expected frequencies can thereafter be employed to compute a log likelihood ratio that is indicative of whether or not the n-gram is a collocation. For instance, the log likelihood ratio can be compared against a predefined threshold, and if the computed log likelihood ratio is above the threshold, the n-gram can be identified as a collocation.

Other aspects will be appreciated upon reading and understanding the attached figures and description.

BRIEF DESCRIPTION OF THE DRAWINGS

FIG. 2 is a table that illustrates frequencies pertaining to prefix/suffix combinations of an n-gram that occurs in a corpus of text.

FIG. 3 is a table that illustrates expected frequencies pertaining to prefix/suffix combinations of an n-gram in a corpus of text.

DETAILED DESCRIPTION

Figure 1:
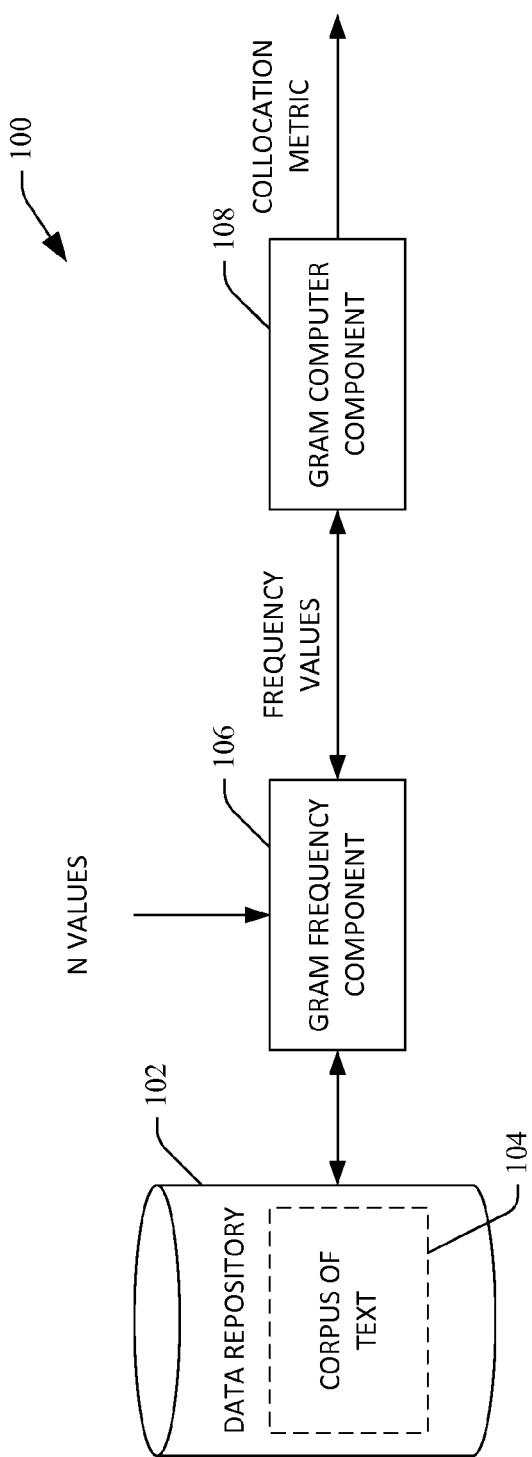
FIG. 1 is a functional block diagram of an exemplary system that facilitates computing values for respective n-grams in a corpus of text that are indicative of whether or not the respective n-grams are collocations.

Various technologies pertaining to identifying collocations in a relatively large corpus of text will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Furthermore, the terms "component" and "system" are intended to encompass hardware-only implementations, such as integrated circuits configured to perform operations described herein. Moreover, the terms "component" and "system" are intended to encompass system-on-chip configurations, cluster-on-chip configurations, and the like.

With reference now to FIG. 1, an exemplary system 100 that facilitates computing a metric that is indicative of whether or not an n-gram in a corpus of text is collocation is illustrated. An n-gram is a sequence of n tokens (words) found in a corpus of text. For instance, in the text "President George Washington", "President George" is a 2-gram (bigram), "George Washington" is 2-gram, and "President George Washington" is a 3-gram. The system 100 is particularly well-suited for analyzing a relatively large corpus of text; for instance, a corpus of text that consumes a plurality of terabytes of computer-readable data storage. Therefore, for instance, a relatively large number of micro-blogs published by way of a web-based micro-blogging application can be collected and analyzed to identify collocations through utilization of the system 100. A collocation is an n-gram that occurs in the corpus of text at a frequency that is greater than would be expected if tokens in the corpus of text are arranged randomly. Identifying collocations in a corpus of text has several beneficial applications. For example, a collocation that is identified in the corpus of text can be employed to summarize such text. In another application, identification of collocations can be employed to detect new or evolving vernacular. In still yet another exemplary application, identification of collocations can be employed in connection with identifying trends (which can be used by advertisers or other businesses to quickly recognize popular phrases, items, etc.). Other applications will also be readily recognized by one skilled in the art.

As will be described in detail below, the system 100 can analyze n-grams of varying lengths (e.g., 2, 3, 4, . . . ) in a single pass when identifying collocations. In other words, while analyzing a corpus of text, the system 100 can analyze 2-grams, 3-grams, 4-grams, etc., in a single pass, within a corpus of text that consumes terabytes, petabytes, etc. of computer-readable data storage.

As the system 100 is employable in connection with analyzing a large corpus of text, in an exemplary embodiment, the system 100 can be configured to execute in a distributed computing environment. Therefore, the system 100 can be distributed across a plurality of computing nodes, wherein a computing node can be an individual computer, a core of a processor and associated memory, a dedicated hardware circuit for performing certain functionality, such as a field programmable gate array (FPGA), or the like. In an exemplary embodiment, the system 100 can be configured for employment in connection with a map-reduce framework. The mapreduce framework supports map operations and reduce operations. Generally, a map operation refers to a master computing node receiving input, dividing such input into smaller sub-problems, and distributing such sub-problems to worker computing nodes. A worker node may undertake the task set forth by the master node and/or can further partition and distribute the received sub-problem to other worker nodes as several smaller sub-problems. In a reduce operation, the master node collects output of the worker nodes (answers to all the sub-problems generated by the worker nodes) and combines such data to form a desired output. The map and reduce operations can be distributed across multiple computing nodes and undertaken in parallel so long as the operations are independent of other operations. As data in the map reduce framework is distributed between computing nodes, key/value pairs are employed to identify corresponding portions of data. As will be shown below, a key generated during a map-reduce operation is structured to facilitate efficiently computing the metric that is indicative of whether an n-gram in a corpus of text is a collocation.

The system 100 comprises a data repository 102 that includes a corpus of text 104. The corpus of text 104 comprises a plurality of tokens arranged in an order. In an exemplary embodiment, the corpus of text 104 is a relatively large corpus of text, on the order of multiple terabytes, multiple petabytes, or larger. Thus, as mentioned above, the corpus of text 104 can comprise micro-blogs generated by way of a web-based message micro-blogging application over some period of time (e.g. a month), public messages generated by way of a social networking application (e.g., status updates), public web logs (blogs) generated by users, web pages, or other suitable documents.

The system 100 further comprises a gram frequency component 106 that receives the corpus of text 104 (which may be a portion of a larger corpus of text) from the data repository 102. The gram frequency component 106 additionally receives a specification as to lengths of n-grams that are desirably analyzed in the corpus of text 104 received by the gram frequency component 106. For instance, a user can specify that 2-grams, 3-grams, 4-grams, and 5-grams are desirably analyzed, such that the values of N received are N=2, 3, 4, and 5. The gram frequency component 106 analyzes n-grams of the lengths specified by the values of N in a single pass over the corpus of text 104. The analysis undertaken by the gram frequency component 106 includes identifying each n-gram (of each specified length), and subsequently identifying a respective prefix and suffix for each n-gram. In an exemplary embodiment, the prefix can be N−1 tokens while the suffix can be one token. In other words, the prefix includes all tokens of an n-gram that are not the suffix. For instance, when analyzing the 3-gram "President George Washington", the gram frequency component 106 can identify "President George" as being the prefix, and can identify "Washington" as being the suffix. It is to be understood, however, that the gram frequency component 106 can be configured to identify a prefix and suffix of an n-gram in any suitable manner when N is greater than two. For instance, the gram frequency component 106 can identify prefixes as containing a single token, while a suffix can contain all tokens but for the prefix. In other embodiments, both the prefix and suffix can include multiple, non-overlapping tokens.

By analyzing each n-gram in accordance with its prefix and suffix, the gram frequency component 106 can output data that is indicative of frequencies of occurrence of tokens pertaining to the n-gram. In an example, through the gram frequency component 106 identifying a prefix and suffix of an n-gram, the following four frequency values can be computed: 1) a number of instances of the prefix/suffix combination in the corpus of text 104; 2) a number of instances that the prefix occurs (as a prefix) without the suffix in the corpus of text 104; 3) a number of instances that the suffix occurs (as a suffix) without the prefix in the corpus of text 104; and 4) a number of n-grams in the corpus of text that include neither the prefix (as a prefix) nor the suffix (as a suffix). Referring briefly to FIG. 2, a table 200 that illustrates these four frequency values that can be computed based upon the analysis of the corpus of text 104 undertaken by the gram frequency component 106 with respect to a certain prefix/suffix combination is illustrated. As shown in the table 200, $k_{11}$ is a number of instances of the prefix/suffix combination in the corpus of text 104, $k_{12}$ is a number of instances that the prefix occurs (as a prefix) without the suffix in the corpus of text 104, $k_{21}$ is a number of instances that the suffix occurs (as a suffix) without the prefix in the corpus of text 104; and $k_{22}$ is a number of n-grams in the corpus of text that include neither the prefix (as a prefix) nor the suffix (as a suffix). $k_{1*}$ refers to a total number of occurrences of the prefix (as a prefix) in the corpus of text 104, $k_{2*}$ refers to a total number of n-grams in the corpus of text 104 that do not include the prefix (as a prefix), $k_{*1}$ refers to a total number of occurrences of the suffix (as a suffix) in the corpus of text 104, $k_{*2}$ refers to a total number of n-grams in the corpus of text 104 that do not include the suffix (as a suffix), and $k_{**}$ is a total number of n-grams in the corpus of text 104 (for a particular value of n).

As noted previously, the system 100 is particularly well-suited for execution in a distributed computing environment. Accordingly, the gram frequency component 106 can generate key/value pairs that facilitate computing the frequencies shown in the table 200 of FIG. 2. As will be shown in greater detail below, a key in a key/value pair generated by the gram frequency component 106 can be a compound key that comprises three elements. For each prefix/suffix combination in the corpus of text 104, the gram frequency component 106 can generate a first key/value pair corresponding to the prefix and a second key/value pair corresponding to the suffix. The first element of the key is a length of the n-gram being considered (N=2, 3, etc.). The second element of the key indicates whether a value corresponding to the key corresponds to the prefix or the suffix. The third element of the key is the prefix or suffix.

A gram computer component 108 receives the key/value pairs output by the gram frequency component 106, computes the frequency values described above based upon the key/value pairs, and subsequently computes the metric that is indicative of whether the n-gram is a collocation based at least in part upon the frequency values. With more particularity, the gram computer component 108 can compute expectancy values that correspond to the frequency values referenced above. Turning briefly to FIG. 3, a table 300 illustrates exemplary expected frequencies for prefix/suffix combinations in the corpus of text 104 analyzed by the gram frequency component 106. For a particular prefix/suffix combination (n-gram), $E_{11}$ is an expected frequency of occurrence of the prefix/suffix combination in the corpus of text 104, $E_{12}$ is an expected frequency of the prefix occurring (as a prefix) without the suffix in the corpus of text 104, $E_{21}$ is an expected frequency of the suffix occurring (as a suffix) without the prefix in the corpus of text 104, and $E_{22}$ is an expected frequency of neither the prefix nor the suffix occurring (as a prefix or suffix, respectively) in n-grams in the corpus of text 104.

$E_{11}$, $E_{12}$, $E_{21}$, and $E_{22}$ can be computed, respectively, as follows:

$$E_{11} = \frac{k_{1*} \times k_{*1}}{k_{**}},$$

$$E_{12} = \frac{k_{1*} \times k_{*2}}{k_{**}},$$

$$E_{21} = \frac{k_{2*} \times k_{*1}}{k_{*1}},$$

and $$E_{22} = \frac{k_{2*} \times k_{*2}}{k_{**}}.$$

Returning to FIG. 1, the gram computer component 108 can compute the expected frequencies shown in the table 300 based upon the frequency values shown in the table 200 for a prefix/suffix combination, and the gram computer component 108 can compute a metric that is indicative of whether or not the n-gram (the prefix/suffix combination) is a collocation. In an exemplary embodiment, the metric can be a log likelihood ratio pertaining to the n-gram, wherein the log likelihood ratio is computed as follows:

$$LLR = 2\sum_{i=1}^{2}\sum_{j=1}^{2} k_{ij}\log\left(\frac{k_{ij}}{E_{ij}}\right).$$

For example, the gram computer component 108, for each considered prefix/suffix combination (n-gram), can compute the metric and can compare such metric with a predefined threshold to ascertain whether the n-gram is a collocation. In another exemplary embodiment, the gram computer component 108 can select a threshold number of n-grams (for each value of N) with highest metrics computed therefor and indicate that such n-grams are collocations. In still yet another exemplary embodiment, the gram computer component 108 can select n-grams that have metrics falling in a highest percentage (e.g., a top 10%) from amongst all metrics for n-grams and indicate that n-grams with such metrics are collocations.

Figure 4:
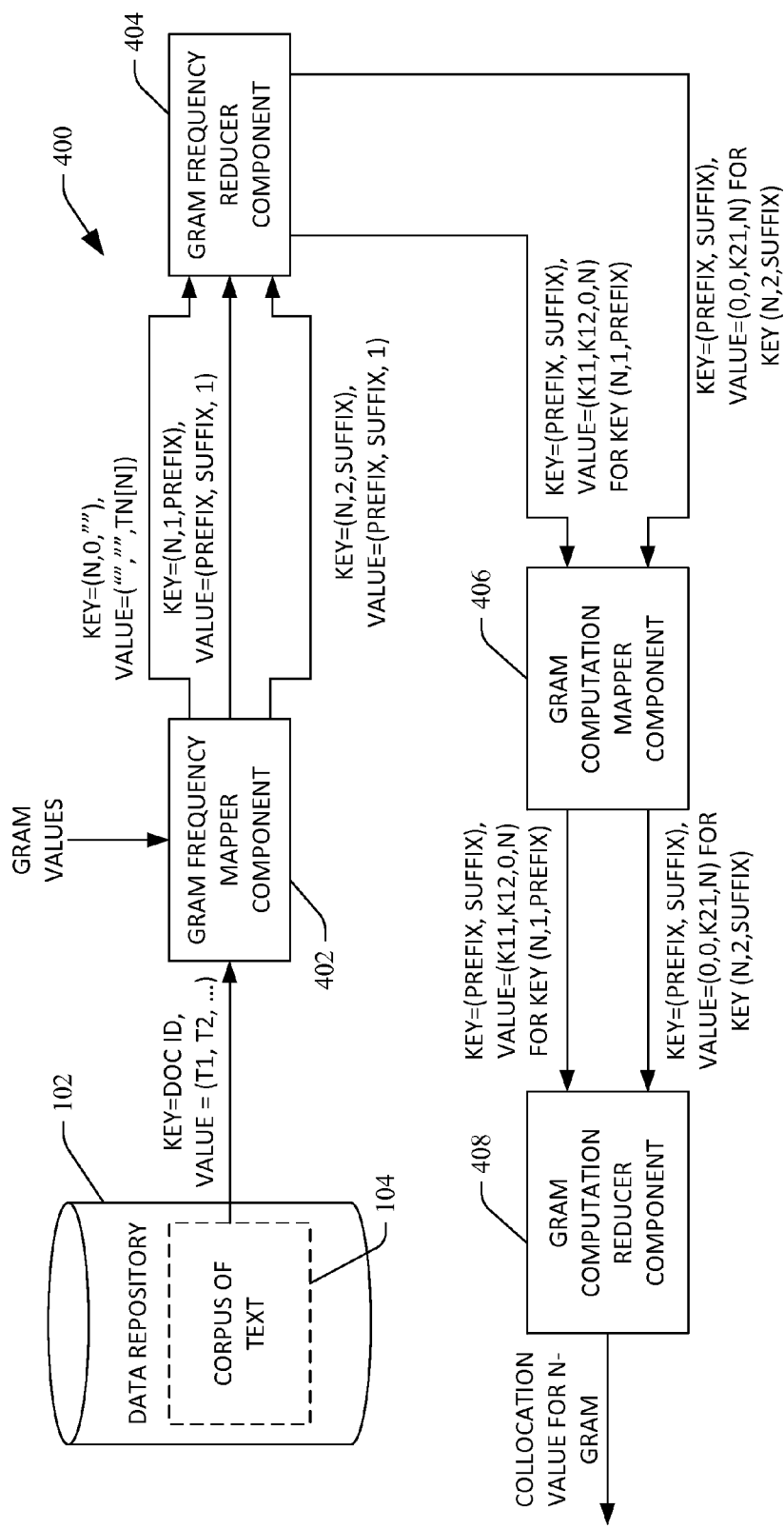
FIG. 4 is an exemplary system configured for employment in a map reduce framework in a distributed computing environment, wherein the system facilitates computing values for respective n-grams in a corpus of text that are indicative of whether or not the respective n-grams are collocations.

Reference is now made to FIG. 4, which depicts an exemplary system 400 that facilitates computing a metric that is indicative of whether or not an n-gram is a collocation is illustrated. The system 400 is configured for employment in a map-reduce framework. Therefore, components of the system 400 can reside on a single computing node or can be distributed across multiple computing nodes. The system 400 includes the data repository 102 that comprises the corpus of text 104. The system 400 further comprises a gram frequency mapper component 402 and a gram frequency reducer component 404. The gram frequency mapper component 402 and the gram frequency reducer component 404 can collectively perform tasks described as being performed by the gram frequency component 106. Therefore, for example, the gram frequency component 106 may comprise the gram frequency mapper component 402 and the gram frequency reducer component 404.

The gram frequency mapper component 402 receives the corpus of text 104, which can be described by a key/value pair, wherein the key of the key/value pair comprises an identifier for the corpus of text 104 (e.g., a document identifier), and the value comprises tokens (in a particular order) in the corpus of text 104. The gram frequency mapper component 402 also receives values for N, such that the gram frequency mapper component 402 can analyze n-grams of varying lengths in the corpus of text 104. The gram frequency mapper component 402 constructs n-grams of the specified lengths from the sequence of tokens (T1, T2, etc.) in the corpus of text 104. The gram frequency mapper component 402 thereafter counts, for each value of N, a number of n-grams constructed from the corpus of text 104. This can be accomplished by outputting, for each n-gram, the following key/value pair: key: (N, 0, " "), value: (" ", " ", 1). Accordingly, if the corpus of text 104 includes 5 n-grams, the gram frequency mapper component 402 will output such key/value pair five times (which is k**). The gram frequency mapper component 402 additionally analyzes the constructed n-grams, and for each n-gram, identifies its prefix and suffix. For each n-gram, the gram frequency mapper component 402 outputs two key/value pairs: a first key/value pair corresponding to the prefix of the n-gram, and a second key/value pair corresponding to the suffix of the n-gram. The first key/value pair is constructed as follows: key: (N, 1, prefix), value: (prefix, suffix, 1), while the second key/value pair is constructed as follows: key: (N, 2, suffix), value: (prefix, suffix, 1). Once the key/value pairs for all prefix/suffix combinations (all n-grams) are sorted, values of $k_{11}$, $k_{12}$, and $k_{21}$ can be readily computed.

The gram frequency reducer component 404 receives such key/value pairs and performs the following actions: first, the gram frequency reducer component 404 sums the values in the key: (N, 0, " "), value: (" ", " ", 1) key/value pairs to compute a total number of n-grams in the corpus of text TN (e.g., k**), and outputs TN to disk. Subsequently, the gram frequency reducer component 404 generates a hash table, with keys of the hash table being prefix/suffix combinations (n-grams) and corresponding values of the hash table being a number of occurrences of each n-gram in the corpus of text 104, wherein the hash table is generated based upon key/value pairs output by the gram frequency mapper component 402. The gram frequency reducer component 404 can analyze the hash table to compute values for $k_{11}$ for each respective n-gram. If, for a particular n-gram, its value of $k_{11}$ is above a threshold (if specified), then the gram frequency reducer component 404 can output two key/value pairs for respective n-gram: a first key/value pair that corresponds to the key (L, 1, prefix) received from the gram frequency mapper component 402: key: (prefix, suffix), value: ($k_{11}$, $k_{12}$, 0, L); and a second key/value pair that corresponds to the key (L, 2, suffix): key: (prefix, suffix), value: (0, 0, $k_{21}$, L).

Exemplary pseudocode corresponding to the gram frequency mapper component 402 is set forth below:

```
1: class Gram Frequency Mapper
2:    method map(doc id, list of tokens)
3:        constructs n-Grams from the list of tokens
4:        for each n-Gram
5:            emits k: (N, 0, ""), v: ("", "", 1)
6:            emits k: (N, 1, prefix), v: (prefix, suffix, 1)
7:            emits k: (N, 2, suffix), v: (prefix, suffix, 1)
```

Exemplary pseudocode corresponding to the gram frequency reducer component 404 is also set forth below:

```
1:    class Gram Frequency Reducer
2:        member ft
3:        method setup( )
4:            ft ← frequency threshold
5:        method reduce((N, V, text), [(prefix, suffix, 1),...])
```

-continued

```
 6:      if V = 0 (or text = "")
 7:          total ← 0
 8:          for each (prefix, suffix) and N
 9:              total ← total + 1
10:          write pair (N,total) to the disk file
11:      if V = 1
12:          create a hashtable<(prefix,suffix), Gram> g
13:          k12 ← 0
14:          for each (prefix, suffix)
15:              k12 ← k12 + 1
16:              if g contains key (prefix, suffix)
17:                  g[(prefix, suffix)] ← g[(prefix, suffix)] + (1, 0, 0, 0)
18:              else
19:                  g ← [(prefix, suffix), (1, 0, 0, 0)]
20:          for each (prefix, suffix)
21:              if g[prefix, suffix].k11 > ft
22:                  create a Gram x(0, 0, 0, 0)
23:                  x.k11 ← g[(prefix, suffix)].k11
24:                  x.k12 ← k12 − x.k11
25:                  x.k22 ← N
26:                  emit k: (prefix, suffix), v: x
27:      if N = 2
28:          create a hashtable<(prefix, suffix), Gram> g
29:          k21 ← 0
30:          for each (prefix, suffix)
31:              k21 ← k21 + 1
32:              if g contains key (prefix, suffix)
33:                  g[(prefix, suffix)] ← g[(prefix, suffix)] + Gram(1, 0, 0, 0)
34:              else
35:                  g ← [(prefix, suffix), Gram(1, 0, 0, 0)]
36:          for each (prefix, suffix)
37:              if g[(prefix, suffix)] > ft
38:                  create a Gram x(0, 0, 0, 0)
39:                  x.k21 ← k21 − g[(prefix, suffix)].k11
40:                  x.k22 ← L
41:              emits k: (prefix, suffix), v: x
```

The system 400 further comprises a gram computation mapper component 406 and a gram computation reducer component 408, which can collectively perform actions described as being performed above by the gram computer component 108. Therefore, for instance, the gram computer component 108 may comprise the gram computation mapper component 406 and the gram computation reducer component 408. The gram computation mapper component 406 acts as an identity mapper, which receives key/value pairs for prefix/suffix combinations output by the gram frequency reducer component 404 and aggregates values that correspond to equivalent keys.

The gram computation reducer component 408 receives the aggregated values for a respective key and merges such aggregated values for each prefix/suffix combination (in received keys of key/value pairs). Thereafter, the gram computation reducer component 408 computes $k_{22}$ for each prefix/suffix combination, and subsequently computes the log likelihood ratio for each prefix/suffix combination (each n-gram). The gram computation reducer component 408 can then output the metric that is indicative of whether or not the n-gram represents a collocation (if such metric is above a predefined threshold).

Exemplary pseudocode for the gram computation reducer component 406 is set forth below:

```
1: class Identity Mapper
2:    method map((prefix, suffix), (k11,k12,k21,N))
3:       emits key=(prefix, suffix),
4:              value= (k11, k12, k21, N)
```

Exemplary pseudocode for the gram computation reducer component 408 is set forth below:

```
 1:   class Gram Computation Reducer
 2:       member k[ ]
 3:       member llrt
 4:       method setup( )
 5:           k[ ] ← array total numbers of 2, 3, ..., N grams
 6:           llrt ← LLR threshold
 7:       method reduce((prefix, suffix),
              [(k11,k12,0,N),(0,0,k21,N)])
 8:           for each (prefix, suffix)
 9:               (k11,k12,k21,N) ← (k11,k12,0,N) + (0,0,k21,N))
10:              k22 ← k[L] − k11 − k12 − k21
11:              llr ← computeLLR(k11, k12, k21, k22)
12:              if llr > llrt
13:                  emits key = (prefix,suffix), value = llr
```

Figure 5:
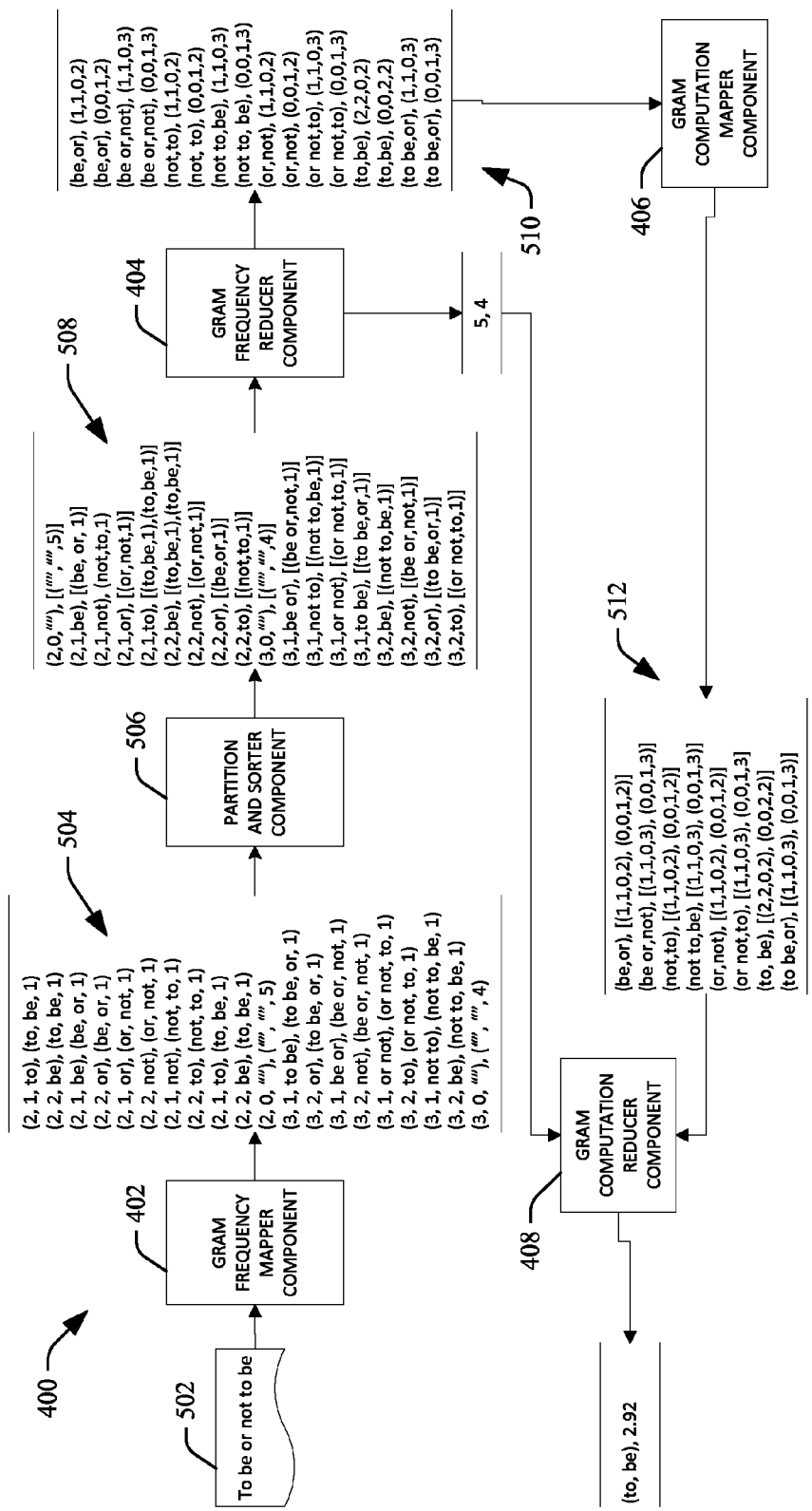
FIG. 5 illustrates an exemplary operation of the system of FIG. 4 for the corpus of text "to be or not to be".

Now referring to FIG. 5, an exemplary operation of the system 400 is shown. In this exemplary operation, a corpus of text 502 received by the gram frequency mapper component 402 comprises the tokens "to be or not to be". In this example, the gram frequency mapper component 402 is configured to analyze 2-grams and 3-grams in the corpus of text 502. The gram frequency mapper component 402 parses the corpus of text 502 and identifies that the corpus of text 502 includes five 2-grams ("to be", "be or", "or not", "not to", and "to be"), and four 3-grams ("to be or", "be or not", "or not to", and "not to be"). In accordance with the description provided above, for the 2-grams, the gram frequency mapper component 402 outputs the key (2, 0 " ") with a corresponding value of (" ", " ", 1) five separate times (shown in FIG. 5 as aggregated key/value pair (2, 0, " "),(" ", " ", 5)). For this key/value pair, the value of 2 in the key indicates that the value corresponds to 2-grams, the value 0 in the key indicates to the gram frequency reducer component 404 that the value corresponds to the total number of 2-grams in the corpus of text 502, and the value " " (empty) shows that no prefix or suffix is considered for the corresponding value.

The gram frequency mapper component 402, as mentioned above, identifies prefixes and suffixes in considered n-grams, and outputs two key/value pairs for each prefix/suffix combination. For instance, for 2-grams in the corpus of text 502, then, the gram frequency mapper component 402 identifies that in the 2-gram "to be", the prefix is "to" and the suffix is "be". The gram frequency mapper component 402 outputs a first key/value pair for such 2-gram: key: (2, 1, to), value: (to, be, 1), and further outputs a second key/value pair for the 2-gram: key: (2, 2, be), value: (to, be, 1). Since the corpus of text 502 includes the prefix/suffix combination "to be" twice, the gram frequency mapper component 402 will generate two equivalent key/value pairs corresponding to the two occurrences of "to be" in the corpus of text 502. In this exemplary operation of the system 400, 2-grams and 3-grams are analyzed; accordingly, the gram frequency mapper component 402 outputs twenty separate key/value pairs 504.

A partition and sorter component 506, which is built into the map-reduce framework, receives these 20 key-value pairs 504 and performs a sort over such key-value pairs. As the prefix/suffix combination "to be" occurs twice (which can be ascertained due to equivalent keys output by the gram frequency mapper component 402), the partition and sorter component 506 aggregates the values corresponding to such keys. The partition and sorter component 506 outputs sorted key/value pairs 508.

The sorted key/value pairs 508 are received by the gram frequency reducer component 404. The gram frequency reducer component 404 outputs values that are indicative of the number of 2-grams and 3-grams in the corpus of text 502 to disk, which is accessible to the gram computation reducer component 408. As shown, the values 5 and 4 can be retrieved from respective values corresponding to keys (2, 0, " ") and ("3, 0, " "). The gram frequency reducer component 404, for each prefix/suffix combination identified by the prefix in a received key from a key/value pair, computes values $k_{11}$ and $k_{12}$. Likewise for each prefix/suffix combination identified by the suffix in a received key from a key/value pair, the gram frequency reducer component 404 computes the values of $k_{21}$. This can be ascertained through analysis of key/value pairs 510 output by the gram frequency reducer component 404.

In the example corresponding to the prefix/suffix combination "to be" (for 2-gram analysis), the gram frequency reducer component 404 receives the key/value pair (2, 1, to), [(to, be, 1), (to, be, 1)] and the key/value pair (2, 2, be), [(to, be, 1), (to, be, 1)]. Using the values in the former of these key/value pairs, the gram frequency reducer component 404 can output the key/value pair (to, be), (2, 2, 0, 2), where the first element represents a number of occurrences of the prefix/suffix combination "to be" in the corpus of text 502 (2), the second element represents the number of occurrences of the prefix "to" (as a prefix) in the corpus of text 502 (2), the third element is set to 0 (predefined), and the fourth element is the value of N (the prefix/suffix combination is a 2-gram). Similarly, using the latter of the two key/value pairs, the gram frequency reducer component 404 can output the key/value pair (to, be), (0, 0, 2, 2), where the first element is set to 0 (predefined), the second element is set to 0 (predefined), the third element represents a number of occurrences of the suffix "be" (as a suffix) in the corpus of text 502, and the fourth element is a value of N (indicating that the suffix corresponds to a 2-gram). As noted above, the gram frequency reducer component 404 can generate such key/value pairs for each prefix and suffix identified by the keys of the key/value pairs output by the partition and sorter component 506.

The gram computation mapper component 406 can receive the key/value pairs output by the gram frequency reducer component 404 and can aggregate values corresponding to equivalent keys. This results in key/value pairs 512. The gram computation reducer component 408 can utilize the values in key/value pairs 512 for the prefix/suffix combinations represented by the keys to ascertain the values for $k_{11}$, $k_{12}$, $k_{21}$, and $k_{22}$ for the prefix/suffix combination (and thus the n-gram). Continuing with the key "to, be", the values (2, 2, 0, 2) and (0, 0, 2, 2) can be utilized, together with the total number of 2-grams output by the gram frequency reducer component 404 (5), to compute the values for $k_{11}$, $k_{12}$, $k_{21}$, and $k_{22}$. In this example, $k_{11}$=2 (the prefix/suffix combination "to be" occurs twice in the corpus of text 502), $k_{21}$=0 (the prefix "to" does not occur as a prefix with any other suffix in the corpus of text 502), $k_{21}$ is 0 (the suffix "be" does not occur as a suffix with any other prefix in the corpus of text 502), and $k_{22}$ is 3 (the two occurrences of the prefix/suffix combination "to be" are subtracted from the total number of 2-grams in the corpus of text 502 to ascertain a number of n-grams that include neither the prefix "to" nor the suffix "be"). From such values, the expected frequency values depicted in the table 300 of FIG. 3 can be computed, and the log likelihood ratio can be computed by the gram computation reducer component 408 utilizing such expected frequency values.

Figure 6:
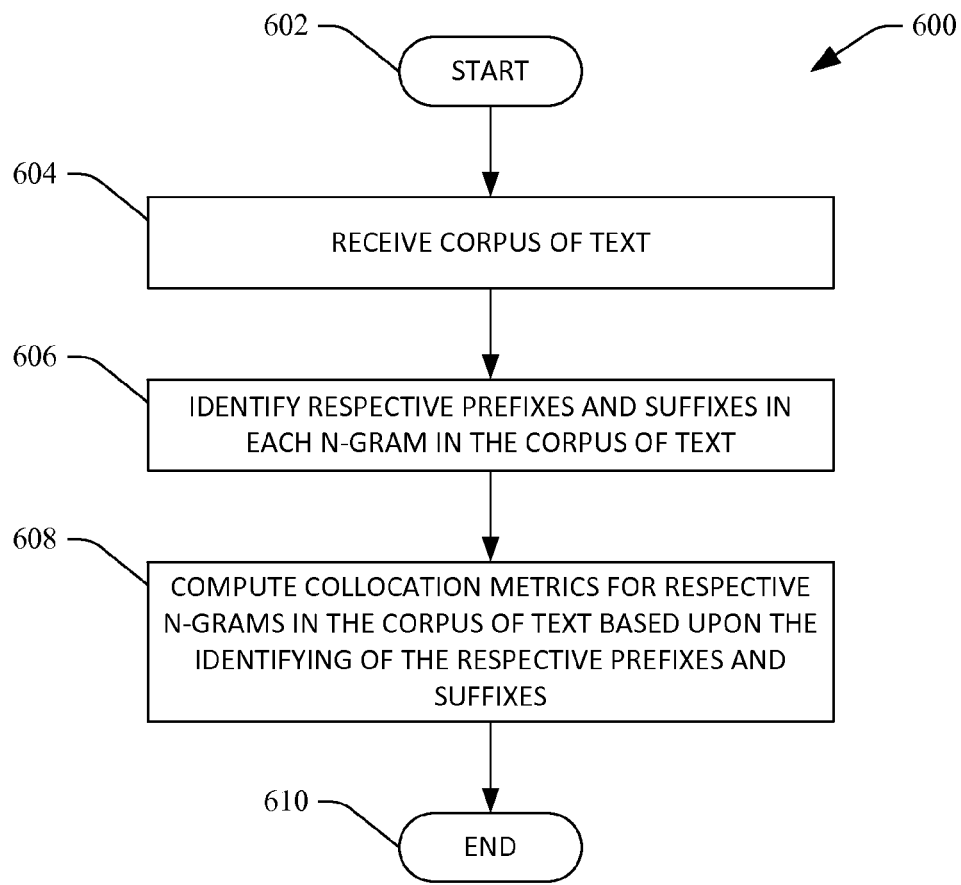
FIG. 6 is a flow diagram that illustrates an exemplary methodology for computing a metric that is indicative of whether an n-gram is a collocation.
Figure 7:
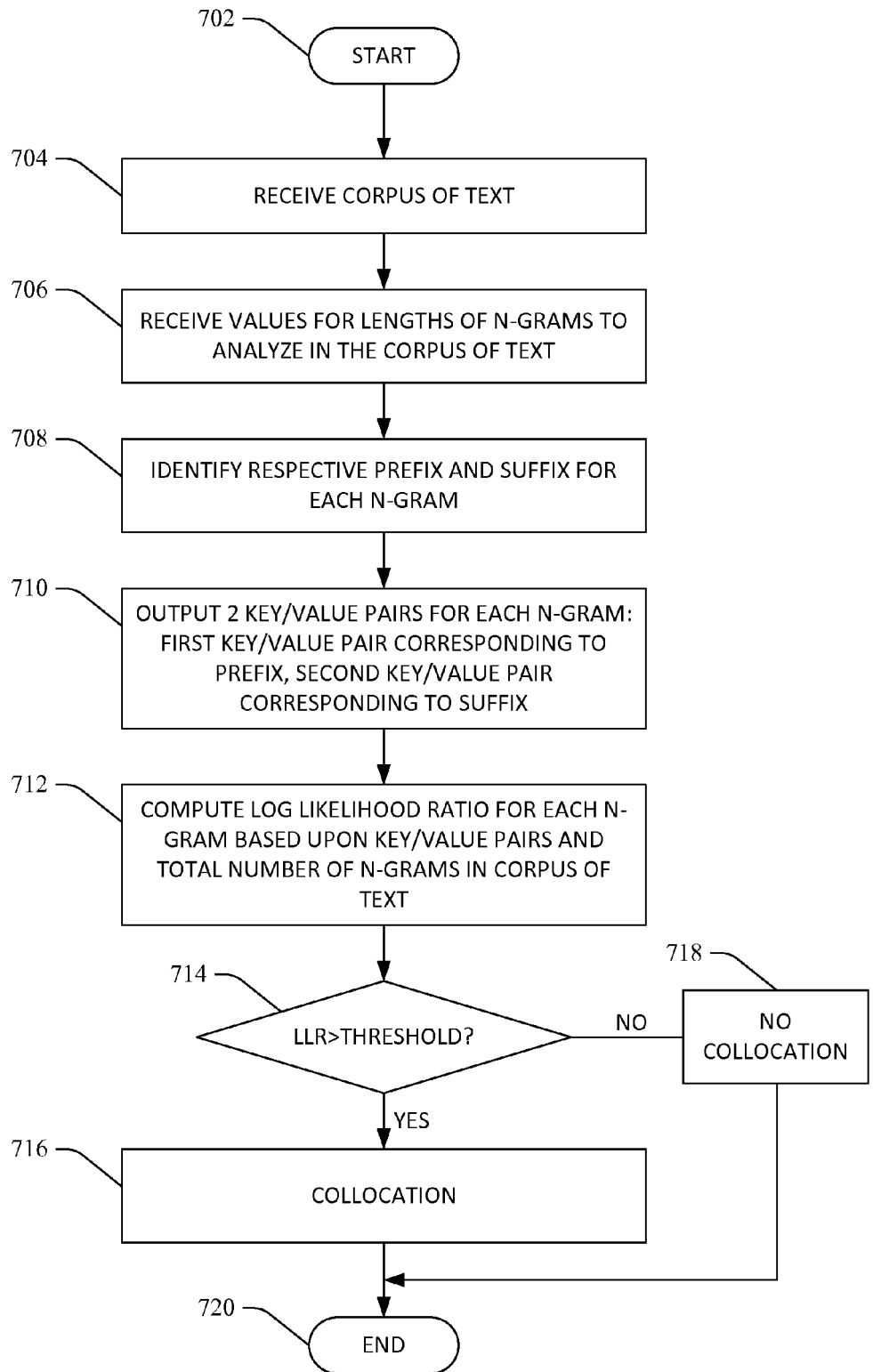
FIG. 7 is a flow diagram that illustrates an exemplary methodology for computing a metric in a distributed computing environment that is indicative of frequency of co-occurrence of sequences of tokens of varying lengths relative to their respective expected frequency of co-occurrence.

With reference now to FIGS. 6-7, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media, which can be any suitable computer-readable data storage device. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 6, an exemplary methodology 600 that facilitates computing a metric that is indicative of whether an n-gram in a corpus of text can be labeled as a collocation is illustrated. The methodology 600 starts at 602, and at 604 a corpus of text is received, wherein the corpus of text comprises a sequence of tokens arranged in an order.

At 606, respective prefixes and suffixes are identified for each n-gram in the corpus of text, wherein N can be a plurality of different values (e.g., 2, 3, 4, . . . ). At 608, in a distributed computing environment, and without requiring multiple secondary sorting operations, values are computed that are indicative of respective frequencies of occurrence of each n-gram relative to their expected frequency of occurrence in the corpus of text, wherein the values are computed based at least in part upon the identifying of the prefixes and suffixes for the n-grams in the corpus of text. Such values are indicative of whether or not the respective n-grams are to be labeled as collocations. As described above, prefix/suffix combinations can be identified for n-grams, where n is greater than 2. The methodology 600 completes at 610.

With reference now to FIG. 7, an exemplary methodology 700 that facilitates computing a log likelihood ratio corresponding to an n-gram in a corpus of text is illustrated. At 702, the corpus of text is received, wherein the corpus of text comprises a plurality of tokens (words) arranged in an order. At 704, values for N are received, wherein a value for N is a length of a gram to be analyzed. At 706, each n-gram in the corpus of text is identified, and a number of n-grams in the corpus of text is counted for each value of N. At 708, a respective prefix and suffix are identified for each n-gram. At 710, two key/value pairs are output for each n-gram: a first key/value pair corresponding to a prefix of the n-gram, and a second key/value pair corresponding to the suffix of the n-gram. The key/value pairs comprise values that are indicative of a frequency of occurrence of the prefix and suffix in combination, a frequency of occurrence of the prefix, as a prefix, without the suffix, a frequency of occurrence of the suffix, as a suffix, without the prefix, and a frequency of occurrence of prefix/suffix combinations that include neither the prefix nor the suffix.

At 712, the log likelihood ratio is computed for each n-gram based at least in part upon these frequency values corresponding to the respective n-grams and the total number of n-grams in the corpus of text. At 714, a determination is made, for each n-gram, as to whether the respective log likelihood ratio is above a predefined threshold. If it is determined that the log likelihood ratio is above the predefined threshold, then the respective n-gram is labeled as a collocation at 716.

If it is determined that the log likelihood ratio is below the predefined threshold, then the respective n-gram is not labeled as a collocation at 718. The methodology 700 completes at 720.

Figure 8:
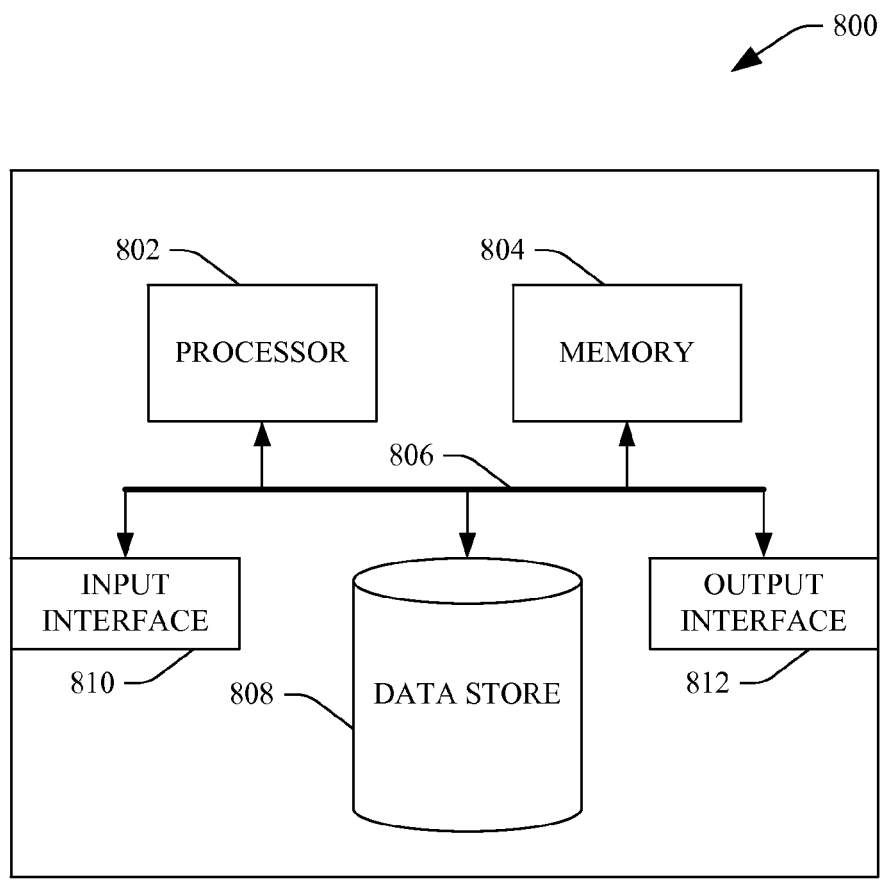
FIG. 8 is an exemplary computing system.

Now referring to FIG. 8, a high-level illustration of an exemplary computing device 800 that can be used in accordance with the systems and methodologies disclosed herein is illustrated. For instance, the computing device 800 may be used in a system that supports computing a metric that is indicative of whether an n-gram is a collocation. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store frequency values, tokens, lengths of n-grams to be analyzed, etc.

The computing device 800 additionally includes a data store 808 that is accessible by the processor 802 by way of the system bus 806. The data store may be or include any suitable computer-readable storage, including a hard disk, memory, etc. The data store 808 may include executable instructions, frequency values, threshold values, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

While the computing device 800 has been presented above as an exemplary operating environment in which features described herein may be implemented, it is to be understood that other environments are also contemplated. For example, hardware-only implementations are contemplated, wherein integrated circuits are configured to perform predefined tasks. Additionally, system-on-chip (SoC) and cluster-on-chip (CoC) implementations of the features described herein are also contemplated. Moreover, as discussed above, features described above are particularly well-suited for distributed computing environments, and such environments may include multiple computing devices (such as that shown in FIG. 8), multiple integrated circuits or other hardware functionality, SoC systems, CoC systems, and/or some combination thereof.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method executed by at least one computing device in a distributed computing environment, the method comprising:

identifying n-grams of differing lengths in a corpus of text, the corpus of text comprising tokens arranged in an order, each identified n-gram comprises a plurality of sequential tokens in the corpus of text;

for each n-gram identified in the corpus of text, identifying a prefix of the n-gram and a suffix of the n-gram;

computing, for each identified n-gram in the corpus of text and in a single pass over the corpus of text, a metric that is indicative of a frequency of occurrence of the n-gram in the corpus of text relative to an expected frequency of occurrence of the n-gram in the corpus of text if the tokens were arranged randomly in the corpus of text, the metric computed based upon the identifying of the prefix of the n-gram and the suffix of the n-gram, the computing of the metric performed by the at least one computing device in the distributed computing environment; and when the metric is above a predefined threshold, assigning a label to the n-gram that indicates that the n-gram is representative of content of the corpus of text.

2. The method of claim 1,
wherein assigning the label to the n-gram comprises:
labeling the n-gram as being a collocation in the corpus of text.

3. The method of claim 1, further comprising:
generating a first key/value pair and a second key/value pair for each identified n-gram, the first key/value pair corresponding to the prefix of the n-gram, the second key/value pair corresponding to the suffix of the n-gram, the first key/value pair comprising a first key that comprises:
a first value that identifies that the first key corresponds to the prefix; and
the prefix,
the second key/value pair comprising a second key that comprises:
a second value that identifies that the second key corresponds to the suffix; and
the suffix, wherein the metric for the several n-grams is computed based upon the first key/value pair and the second key/value pair.

4. The method of claim 3, wherein the first key comprises a third value that identifies length of the n-gram, and wherein the second key comprises the third value.

5. The method of claim 1, wherein identifying n-grams of the differing lengths in the corpus of text is performed by a first computing device in the distributed computing environment, and computing the metric is performed by a second computing device in the distributed computing environment.

6. The method of claim 1, further comprising assigning a second label to the n-gram based upon the metric, the second label indicates that the n-gram is new vernacular.

7. The method of claim 1, wherein identifying the prefix of the n-gram comprises identifying multiple tokens of the n-gram to include in the prefix.

8. The method of claim 1, further comprising:
computing a first frequency value that is indicative of a number of occurrences of the prefix and the suffix as a prefix/suffix combination in the identified n-grams;
computing a second frequency value that is indicative of a number of occurrences of the prefix, as a prefix and without the suffix, in the identified n-grams;
computing a third frequency value that is indicative of a number of occurrences of the suffix, as a suffix and without the prefix, in the identified n-grams, wherein the first frequency value, the second frequency value, and the third frequency value are computed subsequent to identifying the prefix and the suffix of each identified n-gram, and computing the metric for each n-gram in the identified n-grams based upon the first frequency value, the second frequency value, and the third frequency value.

9. The method of claim 8, further comprising, for each n-gram in the identified n-grams:
comparing the first frequency value with a predefined threshold; and
computing the metric for the n-gram only if the first frequency value for the n-gram is greater than the predefined threshold.

10. The method of claim 8, further comprising:
counting a number of n-grams of length N for a particular value of N in the corpus of text;
computing a fourth frequency value that is indicative of a number of n-grams of length N that include neither the prefix nor the suffix based upon the counting of the number of n-grams of length N in the corpus of text; and
computing the metric for n-grams of length N for the particular value of N based upon the fourth frequency value.

11. A distributed computing system that facilitates labelling an n-gram as being representative of content of a corpus of text, the system comprising:
a plurality of computing devices that are in communication with one another, the plurality of computing devices comprising:
respective processing units; and
memory that comprises instructions that, when collectively executed by the processing units, cause the processing units to perform acts comprising:
receiving the corpus of text, the corpus of text comprising a plurality of tokens that are arranged in an order;
computing, for each n-gram in a plurality of identified n-grams in the corpus of text, a metric that is indicative of a frequency of occurrence of the n-gram relative to an expected frequency of occurrence of the n-gram, wherein the identified n-grams comprise n-grams of differing length, and wherein the metric for each n-gram is computed in one pass over the corpus of text; and
for each n-gram in the plurality of n-grams, assigning a label to the n-gram if the metric computed for the n-gram is above a predefined threshold, the label indicates that the n-gram is representative of the content of the corpus of text.

12. The system of claim 11, wherein the corpus of text consumes multiple terabytes of computer-readable data storage.

13. The system of claim 11, wherein computing the metric comprises:
identifying, for each n-gram in the identified n-grams, a prefix of the n-gram and a suffix of the n-gram; and
computing the metric for the n-gram based at least in part upon the identifying the prefix of the n-gram and the suffix of the n-gram.

14. The system of claim 13, wherein at least one of the prefix or the suffix comprises at least two tokens.

15. The system of claim 13, wherein computing the metric comprises computing, for each n-gram, a plurality of frequency values, the frequency values comprising:
a first frequency value that is indicative of a number of occurrences of the n-gram in the corpus of text;
a second frequency value that is indicative of a number of occurrences of the prefix in the corpus of text, as a prefix and without the suffix; and
a third frequency value that is indicative of a number of occurrences of the suffix in the corpus of text, as a suffix and without the prefix, wherein the metric is computed based upon the first frequency value, the second frequency value, and the third frequency value.

16. The system of claim 15, wherein computing the metric for each n-gram comprises:
determining a number of n-grams in the corpus of text with length of the n-gram; and
computing a fourth frequency value that is indicative of a number of n-grams that include neither the prefix nor the suffix based upon the number of n-grams in the corpus of text with length of the n-gram, wherein the metric for the n-gram is computed based upon the fourth frequency value.

17. The system of claim 11, wherein the acts further comprise:
providing the n-gram to a third party based upon the metric, wherein the metric indicates that use of the n-gram is trending upwards.

18. Non-transitory computer-readable media comprising instructions that, when executed by at least one processor, cause the at least one processor to perform acts comprising:
parsing a corpus of text to identify n-grams of differing lengths therein, the corpus of text comprises a plurality of words in an order, each identified n-gram comprises at least two words that appear sequentially in the corpus of text;
for each identified n-gram, identifying a prefix and suffix of the n-gram;
for each identified n-gram, computing, in a single pass over the corpus of text, a value that is indicative of a frequency of occurrence of the n-gram in the corpus of text relative to an expected frequency of occurrence of the n-gram in the corpus of text if the words in the corpus of text were arranged randomly, the value computed based upon the identifying of the prefix and the suffix of the n-gram; and
for each identified n-gram, assigning a label to the n-gram that indicates that the n-gram is representative of content of the corpus of text when the value computed for the n-gram is above a predefined threshold.

19. The computer readable storage device of claim 18, wherein, for each n-gram comprising at least three words, at least one of the prefix or the suffix of the n-gram comprises at least two words.

20. The computer-readable storage device of claim 18, the acts further comprising assigning the n-gram to the corpus of text as being representative of content of the corpus of text.

* * * * *